Patented Apr. 17, 1945

2,373,826

UNITED STATES PATENT OFFICE 2,373,826

PROCESS FOR THE PREPARATION OF ANTHRAQUINONYLAMINO SUBSTITUTION DERIVATIVES OF CYANURIC CHLORIDE

Donald P. Graham, Wilmington, Del., assignor to E. I. du Pont de Nemours & Company, Wilmington, Del., a corporation of Delaware No Drawing. Application July 23, 1942, Serial No. 452,078

2 Claims. (Cl. 260—249)

This invention relates to an improvement in the process for preparing dyes of the anthraquinone series which result from the condensation of amines of the anthraquinone series with cyanuric chloride.

For a number of years it has been known that dyes could be produced by condensing cyanuric chloride with 1-aminoanthraquinone, 2-aminoanthraquinone or higher substitution derivatives and in cases where the third halogen on the cyanuric chloride was not completely replaced in the condensation with these high molecular weight amines, complete replacement of the halogen could be effected by further condensation with arylamines of the benzene or naphthalene series.

Cyanuric chloride contains 3 chlorine atoms of equal reactivity but it has been found that as soon as one chlorine has been replaced by an arylamine group the reactivity of the remaining chlorines is materially decreased. While the first chlorine may be replaced with arylamines when the reaction is carried out in nitrobenzene or other inert solvent at around 100° C., temperatures of from 180 to 190° C. are required to replace the second chlorine atom with the amines of the anthraquinone series in these inert solvents. The third chlorine atom then becomes even less reactive to the extent that it is almost impossible to substitute it with amines of the anthraquinone series in inert solvents under conditions which do not rupture the cyanuric nucleus. Therefore the third chlorine has usually been replaced with the lower molecular aromatic amines such as aniline, toluidine, etc. However, where the more complex arylamines of the anthraquinone series have been substituted for the first two chlorines on the cyanuric chloride, the cyanuric nucleus tend to break down even when attempts are made to complete the substitution with aniline, resulting in a product giving dull shades and in some cases impaired fastness properties.

It was later found as more particularly disclosed in U. S. P. 1,994,602 that cyanuric chloride and certain substitution derivatives thereof could be made to react more readily with amino-anthraquinone compounds if phenol, naphthol or similar solvents were employed in place of the nitrobenzene. By the use of the phenols it was found that the chlorine in the cyanuric chloride could be more readily and more completely replaced than when the inert solvents were used.

I have found however, that where unsubstituted cyanuric chloride is reacted with amines of the anthraquinone series even at 100° C. to 120° C. in phenol or similar solvents as more particularly disclosed in U. S. P. 1,994,602, replacement of the first chlorine involves a reaction with the phenol itself as well as with the anthraquinone amine for while the resulting dyes were found to be free from chlorine they are often inferior in fastness properties. The yield of desired dye was also found to be impaired by the use of such solvent.

It is therefore an object of this invention to provide a process for preparing aminoanthraquinone derivatives of cyanuric chloride which dye in brighter shades than those produced entirely in inert organic solvents, and which exhibit improved fastness properties over those produced where the reaction is initially carried out in phenols.

I have found that dyes of increased purity and therefore brightness of shade and which exhibit good fastness properties can be produced in high yields where at least one, and preferably two, of the chlorine atoms of the cyanuric chloride are first replaced with arylamines, or amines of the anthraquinone series in an inert organic solvent such as nitrobenzene, chlorobenzenes, etc., and where the third chlorine atom is replaced with an arylamine in a phenolic type of solvent at temperatures of 100° C. to 120° C. According to the present invention the final chlorine atom may be replaced with an aromatic amine either of the benzene or naphthalene series or by a higher molecular weight aromatic amine of the anthraquinone class without breaking down the cyanuric nucleus as often occurs at the higher temperatures required with inert organic solvents, and without the formation of undesirable by-products resulting in the reaction of the first chlorine atom of the cyanuric chloride with the phenolic solvents.

The following examples are given to illustrate the invention. The parts used are by weight.

Example 1

18 parts of cyanuric chloride are slurried in 700 parts of nitrobenzene and 70 parts of 4-amino-2:1(N)-anthraquinone-benzacridone are added. The mass is heated, under agitation to a temperature of 200° C. to 210° C. (reflux) over a period of two hours and maintained at that temperature for one hour. It is then cooled to 120° C., filtered, washed with 50 parts of nitrobenzene, then with alcohol until wash is clear, and dried.

Ten parts of the 2:4-diarylamino-6-chloro-1:3:5-triazine thus prepared are slurried in 200 parts of molten phenol at 100° C. Five parts of aniline are added and the charge is stirred for several hours at 100° C. to 120° C. The charge is then diluted with at least 200 parts of alcohol and filtered. The cake is washed (or steamed) free of solvent, and dried. A yield of approximately 10 parts of product is obtained. This product is a blue solid which dissolves in concentrated sulfuric acid with a red color and dyes cotton from a bluish red vat in greenish blue shades.

The substitution of 2.8 parts of 1-amino-anthraquinone for the aniline used in this example results in a somewhat redder shade of blue. A still redder shade is obtained if 4.8 parts of 4-amino-2:1(N)-anthraquinone-benzacridone are used instead of the aniline in this example.

*Example 2*

Thirty parts of the diarylamino-chloro-1:3:5-triazine, prepared by condensing cyanuric chloride with two molecular proportions of 1-amino-5-[(p-methyl-sulfonyl-benzoyl)-amino]-anthraquinone in nitrobenzene in the manner described in Example 1, are dissolved in 600 parts of molten phenol at 100° C. Ten parts of aniline are added and the charge is stirred for several hours at 100° C. to 120° C. The mass is then cooled to 75° C., diluted with alcohol, and filtered. The cake is washed free of phenol with alcohol then with water and dried. The product is an orange colored solid soluble in concentrated sulfuric acid with a yellow color. It dyes cotton in fast orange-yellow shades from a brownish-red vat.

Greener shades of yellow are obtained if the diarylamino-chloro-1:3:5-triazine prepared by the condensation of cyanuric chloride with two molecular proportions of 1-amino-5-benzoylamino-anthraquinone is used as the starting intermediate.

*Example 3*

Six parts of the arylamino-dichloro-1:3:5-triazine resulting from the condensation of cyanuric chloride with one molecular proportion of 1-amino-6-chloro-anthraquinone in nitrobenzene at 100° C. to 110° C., are dissolved in 100 parts of molten phenol at 100° C. 4.1 parts of 4-amino-N-methyl-1:9-anthrapyridone are added and the charge stirred at 100° C. to 110° C. for two or more hours. Five parts of aniline are added and the mass stirred two hours longer at 100° C. to 110° C. It is then cooled to about 75° C., diluted with alcohol, and filtered. The cake is washed free of phenol with alcohol, then with water and dried. The product is an orange solid which dissolves in concentrated sulfuric acid with a yellow color and dyes cotton in fast orange shades from a red-brown vat.

By the process as above described the final condensation products are of higher purity than those which have been produced where the condensations were carried out either in inert organic solvents alone or where the condensations were carried out in phenolic solvents alone. Apparently, it was not previously recognized that where phenolic solvents are employed in the replacement of the first chlorine of cyanuric chloride, a side reaction takes place. I have found that where a phenolic solvent is employed in the initial condensation there is a reaction with the phenol resulting in a product that has impaired fastness properties and the formation of by-products that cannot be readily separated therefrom, thus impairing the yield of effective color.

As illustrated in the above examples the mono-, or diarylamino- derivative of cyanuric chloride prepared by carrying out the initial condensation in an inert organic solvent such as nitrobenzene, chlorobenzenes, naphthalene, etc., may be easily condensed in a phenolic solvent with an arylamine to replace the third or remaining chlorine with the formation of a minimum of by-products whereby colors of high purity are obtained in high yield, which exhibit good fastness properties. The diarylamino derivative may contain the same or different arylamine groups replacing the two chlorine atoms of the cyanuric chloride.

In the specification and claims the term "inert organic solvent" is used to refer to those solvents which are actually inert with respect to the reactants employed under the conditions used in effecting condensation of the aryl amines with the first chlorine of cyanuric chloride and which therefore do not contain reactive hydroxyl groups.

I claim:

1. In the process for preparing triarylamino substitution derivatives of cyanuric chloride the steps which comprise carrying out the replacement of two of the chlorine atoms of the cyanuric chloride molecule with amines of the anthraquinone series in an inert organic solvent, carrying out replacement of the third chlorine atom with an arylamine in a solvent of the class consisting of phenols and naphthols at temperatures of from 100° C. to 120° C.

2. In the process for preparing triarylamino substitution derivatives of cyanuric chloride the steps which comprise carrying out the replacement of two of the chlorine atoms of the cyanuric chloride molecule with an amine of the anthraquinone series in nitrobenzene, carrying out the replacement of the third chlorine atom with an arylamine in a solvent of the class consisting of phenols and naphthols at temperatures of from 100° C. to 120° C.

DONALD P. GRAHAM.